Sept. 15, 1959 R. G. FERRIS 2,904,001
PARLOR STALL ARRANGEMENT FOR MILKING AND FEEDING CATTLE
Original Filed Oct. 14, 1957 3 Sheets-Sheet 2

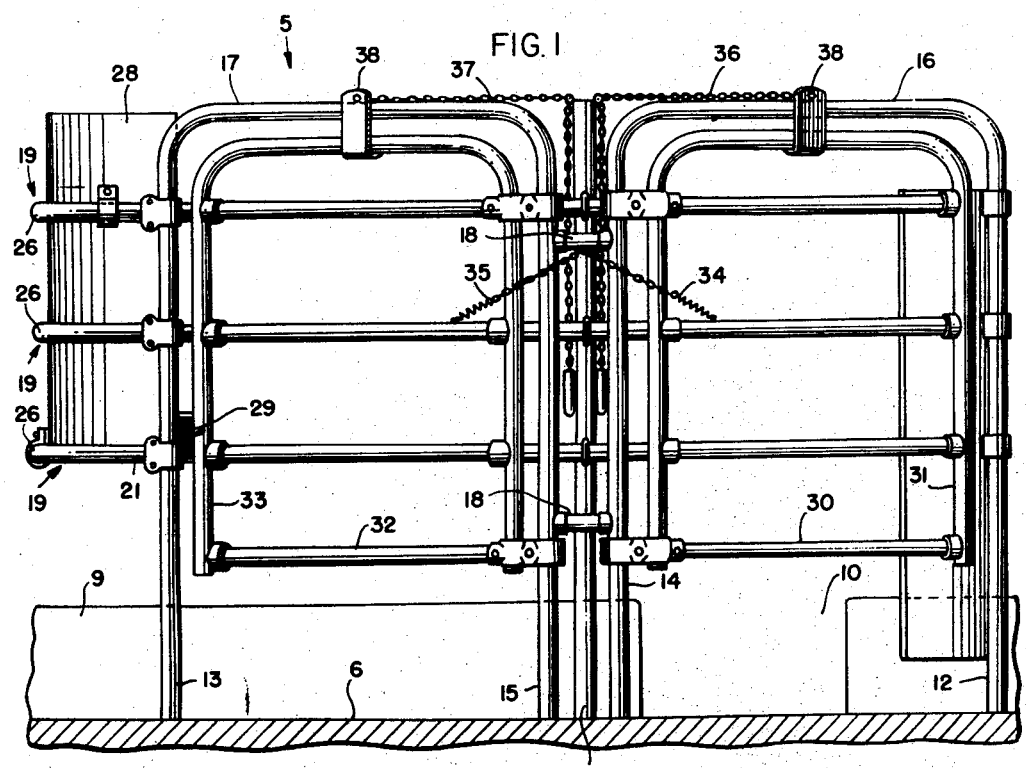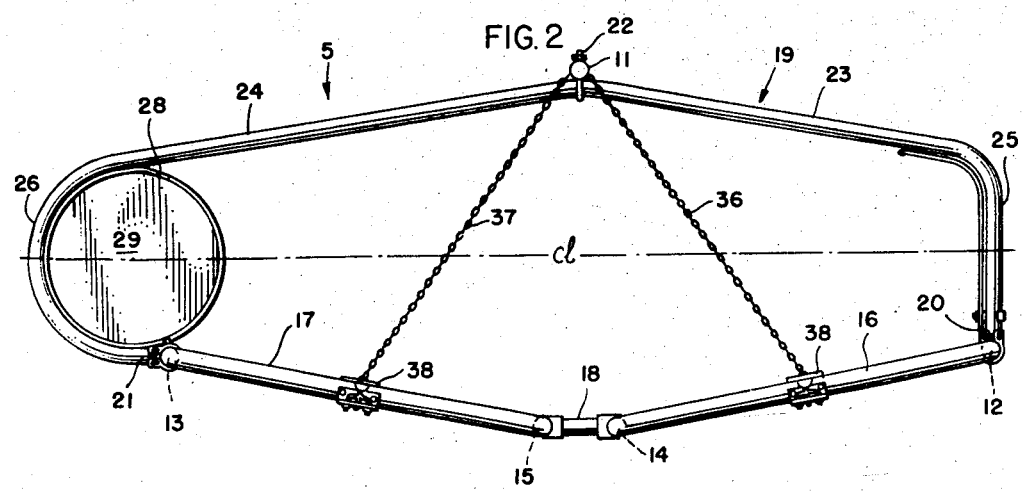

INVENTOR:
ROBERT G. FERRIS
BY
Schroeder, Hofgren, Brady o Wegner
ATT'YS

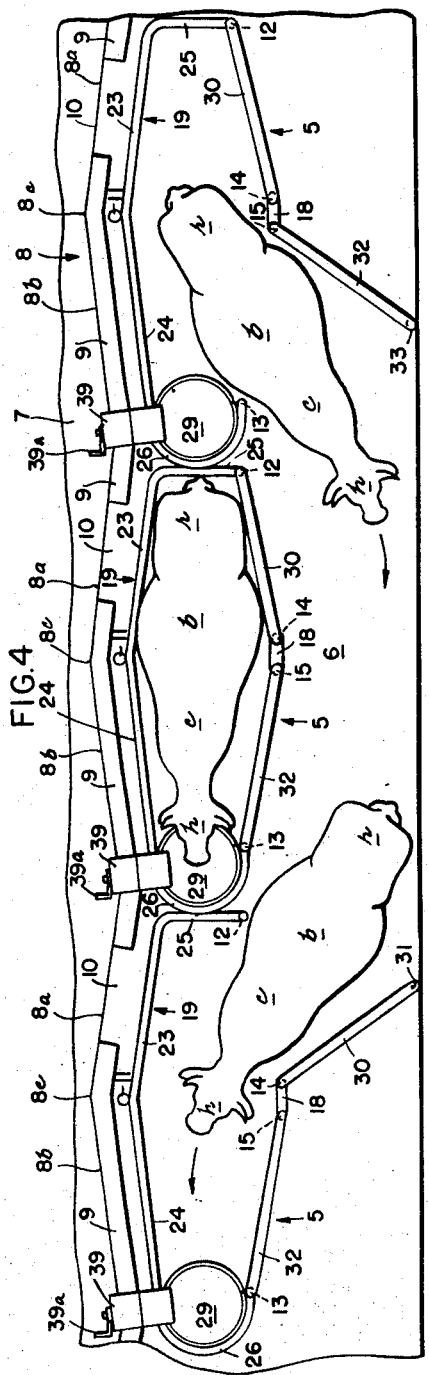

United States Patent Office 2,904,001
Patented Sept. 15, 1959

2,904,001

PARLOR STALL ARRANGEMENT FOR MILKING AND FEEDING CATTLE

Robert G. Ferris, Harvard, Ill., assignor to Starline, Inc., a corporation of Illinois Original application October 14, 1957, Serial No. 689,796. Divided and this application August 15, 1958, Serial No. 755,274

3 Claims. (Cl. 119—14.03)

This invention relates to a parlor stall arrangement for milking and feeding cattle and is a divisional application of application No. 689,796, filed October 14, 1957.

Parlor stalls are used almost entirely for machine milking of cattle, and as a rule the milking machine is fastened to a portion of the stall frame. Thus, it is desirable that the cow be as closely confined as possible by the stalls so that she cannot move enough to interfere with operation of the milking machine.

One type of parlor stall has an entrance and an exit gate both at the rear of the stall, with a feed trough in the stall at the end adjacent the exit gate. Such stalls have commonly been made with an enclosure the front portion of which, opposite the gates, is straight; so that the front portion may be placed very close and parallel to a common wall which separates the cow stall floor from an operator's alley which is at a lower level.

It is also common to arrange milking parlor stalls generally end to end alongside the operator's alley, and the stall gates are arranged so that they may be manipulated by an operator in the alley to let cows in and out of the several stalls in the milking parlor. Each stall has a feed trough at the exit end, and it is common practice to place a feed metering device alongside the feed trough where the operator may meter the feed for each cow from the operator's alley. He may also handle the milk buckets, teat cups, and other equipment from the operator's alley.

A parlor stall of the type described in co-pending application No. 689,796 eliminates the straight front panel for the stall enclosure which, to the best of applicant's knowledge, has been standard in parlor stall constructions; and instead uses a front enclosure panel means which has two panel portions disposed at a large obtuse angle with respect to each other. Opposite the apex of the angle formed by the front panel portions are closely adjacent posts for the entrance and exit gates, and these gates when closed also form a large obtuse angle which is substantially identical with the angle formed by the front panel portions. The two ends of the stall are made substantially in accordance with the disclosure of Robert G. Ferris Patent 2,688,309.

A stall of this construction also permits an arrangement of the milking parlor which eliminates certain undesirable features which were necessarily found in parlors using stalls having a straight front enclosure panel, and in which the stalls were arranged generally end to end. The feed meters used with the feed boxes for the individual stalls must be at a height where they are easily handled by the operator in the alley; and this places them in such a position that the operator must be careful not to injure himself on them as he moves about in the alley. Some milking parlor layouts minimize the problem of feed meter location by orienting the parlor stalls with their longitudinal center lines in closely parallel planes, and providing the cow floor with a saw tooth wall which runs along the front of a stall and then inwardly along an end of the stall, then makes a right angle turn to go along the front of the next stall. The feed meters may then be positioned at the ends of the stalls where they do not extend into the open, traveled part of the operator's alley. Such an arrangement is generally undesirable because it produces corners from which it is difficult to remove refuse for thorough cleaning of the parlor in accordance with sanitary requirements.

This type of parlor stall construction may be arranged in a milking parlor in two different ways, either one of which places the feed metering device either entirely out of the traveled part of the operator's alley, or almost entirely out of it. At the same time, the operator's alley may be separated from the cow floor either by a straight common wall portion or by a common wall which forms a succession of obtusely related planes which present no cleaning problem.

In the preferred arrangement, the common upright wall between the cow floor and the operator's alley is straight, and the stalls are oriented with the front panel which is across from the stall entrance gate parallel to the common wall. The obtuse angle between the two front panel portions thus causes the panel portion adjacent the feed box to be angled away from the common wall portion a sufficient distance that the feed metering device may be wholly above the cow floor where it is entirely out of the operator's way but may be easily reached from the alley.

In the second arrangement, the stalls are placed upon a common longitudinal center line; and the common wall which separates the operator's alley from the cow floor is formed with a succession of obtusely related planes each of which is very close and substantially parallel to the immediately adjacent front panel portion of a stall. This construction results in shallow recesses adjacent the feed boxes on the successive stalls, and the angle of the stall front wall panels is such that almost the entire feed metering device is on the cow floor side of a vertical plane which passes through the most outwardly projecting parts of the common margin.

It may be seen that the present parlor layout, in either arrangement, positions the cow's udder close to the operator's alley, where the operator may easily attach the teat cups of a milking machine.

Furthermore, where a pipeline system is used the carry-off line is always parallel to the curb between the cow floor and the operator's alley, and in the present parlor layout the cow's head is farther from the pipeline, where she cannot bump it. In the arrangement using the curb with obtusely related planes the pipeline is parallel to that portion of the curb which is adjacent the rear of the stall, so again the cow's head is away from the pipeline. In each case the longitudinal center-line of the stall, and thus the cow's spine, is positioned at an angle with respect to the curb line rather than being either parallel or perpendicular to it as in other parlor arrangements.

The arrangement using a straight curb has one additional advantage in that the feed box is spaced from the operator's alley so that feed scattered by the cow lands on the cow floor rather than in the operator's alley, and thus simplifies cleaning.

The stall construction permits the cow to stand in a natural position, with the spine straight. Most parlor stalls either allow too great movement, or force the cow to curve the spine and bend the neck while in the stall.

The invention is illustrated in the accompanying drawings in which:

Fig. 1 is a rear elevational view of a cow stall constructed in accordance with the co-pending application;

Fig. 2 is a plan view of such a cow stall;

Fig. 4 is a diagrammatic plan view of the alternative form of parlor arrangement.

Figure 3:
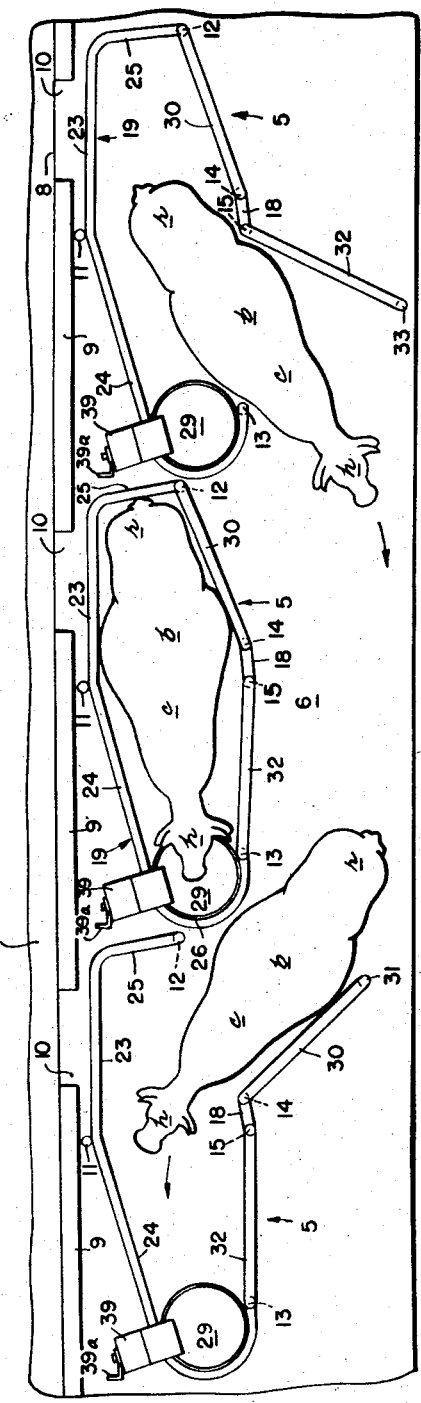
Fig. 3 is a diagrammatic plan view of the preferred parlor stall arrangement with a feed metering device in place, and showing the positions of cows entering, leaving and confined in the stalls.

Referring to the drawings in greater detail, and referring first to Figs. 1 and 2, a cow stall indicated generally at 5 is positioned on a cow floor 6 which is separated from an operator's alley 7 which is usually at a lower level than the cow floor by a common upright margin or wall 8. Extending along the edge of the cow floor 6 is an upstanding curb 9 which has an opening 10 through which an operator in the alley 7 may readily apply the teat cups of a milking machine to the teats of a cow in the stall.

The stall takes the form of an enclosure which is supported on a center post 11 at the front of the stall, an entrance corner post 12, an exit corner post 13, an entrance gate post 14, and an exit gate post 15, all of which are set in the concrete cow floor 6. Conveniently, the corner post 12 and gate post 14 are the upright sides of an entrance gate arch 16, while the corner post 13 and the gate post 15 form the uprights of an exit gate arch 17. The gate posts 14 and 15 are connected by a pair of suitable short center rails 18.

The body of the stall is formed by three parallel horizontal rails, indicated generally at 19, each of which is shaped in a particular manner so that its ends 20 and 21 may be secured, respectively, to the corner posts 12 and 13 while its intermediate portion extends through a U bolt 22 by means of which it is secured to the center post 11.

Each of the rails 19 is bent to provide a first front panel portion 23 which is opposite the entrance arch 16 and a second front panel portion 24 which is opposite the exit arch 17, and these front panel portions are disposed at a large obtuse angle with respect to one another, the apex of the angle being at the U bolt 22 by means of which the rail is clamped to the center post 11. The portion of the rail 19 adjacent the first front panel 23 is bent to form a straight end panel portion 25 which terminates in the end portion 20 secured to the corner post 12. At the opposite end of the rail 19, the front panel portion 24 merges into an arcuate enclosure 26 which has one side 27 forming a straight, or substantially straight projection of the front panel portion 24, while the other side of the arcuate portion 26 terminates in the end portion 21 which is secured to the corner post 13. Thus, the arcuate enclosure 26 may support a shield 28 and feed box 29.

Hung on the gate post 14 in the entrance gate arch 16 is an entrance gate 30 the free side 31 of which closes against, or immediately adjacent the corner post 12; and hung on the gate post 15 in the exit gate arch 17 is an exit gate 32 the free side 33 of which closes against or adjacent the corner post 13. Thus, the gates are pivoted on adjacent upright axes. The term "adjacent axes" is used herein to mean either "next to" or "coaxial"; as it is obvious that the structural principle of the stall is the same whether the gates are on separate posts or a single post.

As seen in Fig. 1, the gate 30 is provided with a chain and spring unit 34, while the gate 32 is provided with a chain and spring unit 35 which tend to open said gates. From the center post 11 a cable or chain 36 may be used to operate the gate 30, and a similar cable or chain 37 may be used to operate the gate 32. Each gate has a latch mechanism, indicated generally at 38, which latches it to the top of its gate arch. This latch mechanism may conveniently be of the type disclosed in Ferris Patent 2,668,381, although others may be used.

Fig. 2 in the drawings is provided with a dot dash line *cl* which is the longitudinal center line of the parlor stall; and it is seen that the stall is almost entirely symmetrical with respect to the center line *cl*, and that the center post 11 is directly opposite the middle of the center rail 18. Thus the apex of the obtuse angle formed by the gate arches 16 and 17 is directly opposite the apex of the angle formed by the front panel portions 23 and 24. The ground area enclosed by the parlor stall may be described as having the form of a rectangle which is flanked by a pair of triangles the heights of which are very small relative to the lengths of their bases. Considering the rectangular area bounded by a line intersecting the corner posts 12 and 13 and a line parallel to said line which intersects the front panel portions 23 and 24 directly opposite the corner posts, each of the triangular areas has a height which is not quite half the width of the rectangle; so that the parlor stall 5 is almost twice as wide at its central area as it is at the two ends. Thus, as seen in Figs. 3 and 4, each stall 5 may accommodate the barrel *b* of a cow C at its wide central area, while the rump *r* of the cow is closely confined by the relatively narrow span between the first front panel portion 23 and the entrance gate 30, while the cow's head *h* is positioned comfortably above the feed box 29.

The improved parlor stall described is readily adaptable to two unique milking parlor arrangements of the present invention, which are illustrated in Figs. 3 and 4.

In the preferred arrangement of Fig. 3, the common margin or wall 8 between cow floor 6 and the operator's alley 7 is straight from end to end, and the stalls 5 are set with the first front panel portion 23 parallel to the common margin 8, so that as seen in Fig. 3 said first front panel portions 23 of all the stalls are longitudinally aligned with one another. Thus, when a cow C is confined in a stall 5, as is the case with the center stall of Fig. 3, the cow's udder is close enough to the operator's alley 7 that the operator may readily reach the teats for attachment of the teat cups.

The angle of the second front panel portion 24 with respect to the portion 23 is such that the feed box 29 is a substantial distance from the common wall 8 and curbing 9; so that a feed metering device 39 mounted above the rails 19 is entirely to the cow floor side of the common margin 8. Thus, while the handle 39a of the feed metering device is readily accessible to the operator standing in the alley 7, the feed metering device is entirely clear of the alley and out of the way.

In the alternative parlor arrangement illustrated in Fig. 4, the parlor stalls 5 are positioned on a common center line, so that they are in a true tandem arrangement instead of the modified tandem arrangement of Fig. 3. In this case it is necessary to form the common margin or wall 8 between the cow floor 6 and the operator's alley 7 in such a way that the portion of the common margin 8a which is adjacent the first front panel 23 of each stall is generally parallel to said front panel. Thus, the relationship between the side of the operator's alley 7 and the cow C confined in a stall 5 is the same as it is in the preferred arrangement of Fig. 3. Connecting the common wall portions 8a are wall portions 8b which are parallel to the second front panels 24 of the stalls 5, so that as seen in Fig. 4 the common margin or wall forms a succession of obtusely related planes 8a and 8b.

In this parlor arrangement, the feed metering devices 39 for the stalls 5 project into the operator's alley 7, but due to the undulating, or flat zigzag form of the common margin between the alley and the cow floor 6, the metering devices 39 are substantially entirely to the cow floor side of the line connecting the apexes 8c of the obtusely related wall segments 8a and 8b adjacent a single cow stall 5. Thus, while the feed metering device extends into the operator's alley, it is out of the normal traveled part of the alley, and the operator is unlikely to bump himself on it. The apexes 8c of the common margin are the points nearest the center posts 11 of the stalls, and thus are also the points at which the common margin is nearest to the apexes of the front panel angles of all the stalls.

Comparison of Figs. 3 and 4 makes it apparent that in both arrangements the feed metering device is substantially entirely to the cow floor side of a vertical plane which connects those portions of the common margin which are nearest the apexes of the front panel angles of all the stalls. Thus, whether the common margin is straight as seen in Fig. 3 or consists of a succession of obtusely related planes as seen in Fig. 4, the feed metering devices 39 are entirely, or substantially entirely out of the way of the operator as he moves about in the alley 7, while being readily accessible to him.

The foregoing detailed description is given for clearness of understanding only and no unnecessary limitations should be understood therefrom, as modifications will be obvious to those skilled in the art.

I claim:

1. A milking parlor arrangement comprising: an operator's alley; an elevated cow floor alongside said alley and having an upright common margin therewith; a plurality of parlor stalls arranged on said cow floor generally end to end, each stall having first and second front panel portions disposed in the form of a large obtuse angle the apex of which is immediately adjacent said common margin, and at least the first of said panel portions being in a plane generally parallel to the immediately adjacent portion of said margin, each stall having a movable entrance gate opposite the first panel portion and a movable exit gate; a feed box in each stall at the end adjacent the exit gate; and a feed metering device adjacent each feed box, the angle formed by the two front panel portions of each stall being such that the feed metering device is substantially entirely to the cow floor side of a vertical plane through those portions of the common margin which are nearest the apexes of the angles formed by the front panel portions of all said stalls.

2. A milking parlor arrangement comprising: a cow floor; a plurality of parlor stalls arranged on said cow floor along a common longitudinal center line, each stall having first and second front panel portions disposed in the form of a large obtuse angle the apex of which is adjacent a margin of the cow floor, each stall having a movable entrance gate opposite the first panel portion and a movable exit gate; a feed box in each stall at the end adjacent the exit gate; an operator's alley adjacent the front panels of said stalls and below the level of the cow floor, said alley and said cow floor having a common upright margin which forms a succession of obtusely related planes each of which is very close and substantially parallel to the plane of the immediately adjacent front panel portion of a stall; and a feed metering device adjacent each feed box the angle formed by the front panel portions of each stall being such that the feed metering device is substantially entirely to the cow floor side of a vertical plane through those portions of the common margin which are nearest the apexes of the angles formed by the front panel portions of all said stalls.

3. A milking parlor arrangement comprising: an operator's alley; an elevated cow floor alongside said alley and having an upright, common margin therewith which is straight from end to end of the alley; a plurality of parlor stalls arranged on said cow floor generally end to end, each stall having a first front panel portion immediately adjacent and parallel to said common margin and a second front panel portion disposed at a large obtuse angle to the first panel portion, each stall having a movable entrance gate opposite the first panel portion and a movable exit gate; a feed box in each stall at the end adjacent the exit gate; and a feed metering device adjacent each feed box the angle formed by the two front panel portions of each stall being such that the feed metering device is entirely to the cow floor side of the plane of said common margin.

References Cited in the file of this patent
UNITED STATES PATENTS

| | | |
|---|---|---|
| 2,198,048 | Babson et al. | Apr. 23, 1940 |
| 2,587,846 | Hodson | Mar. 4, 1952 |
| 2,688,309 | Ferris | Sept. 7, 1954 |
| 2,726,635 | Ferris | Dec. 13, 1955 |